US008071248B2

(12) United States Patent
Ballantine

(10) Patent No.: US 8,071,248 B2
(45) Date of Patent: Dec. 6, 2011

(54) STRUCTURE AND METHOD FOR OPTIMIZING SYSTEM EFFICIENCY WHEN OPERATING AN SOFC SYSTEM WITH ALCOHOL FUELS

(75) Inventor: Arne Ballantine, Menlo Park, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1324 days.

(21) Appl. No.: 11/656,445

(22) Filed: Jan. 23, 2007

(65) Prior Publication Data

US 2010/0273082 A1    Oct. 28, 2010

(51) Int. Cl.
  *H01M 8/04* (2006.01)
(52) U.S. Cl. ...................... 429/443; 429/450
(58) Field of Classification Search ............... None
  See application file for complete search history.

(56) References Cited

U.S. PATENT DOCUMENTS

| | | | |
|---|---|---|---|
| 5,723,228 A | 3/1998 | Okamoto | |
| 6,740,432 B1 * | 5/2004 | Shimanuki et al. | 429/408 |
| 6,777,116 B1 | 8/2004 | Mueller et al. | |
| 2002/0025465 A1 * | 2/2002 | Christen et al. | 429/24 |
| 2004/0202914 A1 | 10/2004 | Sridhar et al. | |
| 2005/0164051 A1 | 7/2005 | Venkataraman et al. | |

FOREIGN PATENT DOCUMENTS

| | | |
|---|---|---|
| JP | 08-091804 A | 4/1996 |
| KR | 10-2006-0135391 A | 12/2006 |

OTHER PUBLICATIONS

U.S. Appl. No. 60/842,361, filed Sep. 6, 2006, Venkataraman et al.
U.S. Appl. No. 11/522,361, filed Sep. 6, 2006, Gottmann et al.
U.S. Appl. No. 11/522,976, filed Sep. 19, 2006, Gottmann.
U.S. Appl. No. 11/730,541, filed Apr. 2, 2007, Lyle.

* cited by examiner

*Primary Examiner* — Barbara L. Gilliam
*Assistant Examiner* — Stephan Essex
(74) *Attorney, Agent, or Firm* — The Marbury Law Group PLLC

(57) ABSTRACT

A fuel cell system includes a fuel cell stack, a fuel inlet conduit, a water inlet conduit, and a hydrometer, such as an alcoholometer. The hydrometer is adapted to provide a measurement of a water-to-fuel ratio of a fuel inlet stream within the fuel inlet conduit. The water inlet conduit is adapted to provide a quantity of water to the fuel inlet conduit in order to achieve a desired water-to-ratio being provided to the fuel cell stack.

26 Claims, 3 Drawing Sheets

US 8,071,248 B2

STRUCTURE AND METHOD FOR OPTIMIZING SYSTEM EFFICIENCY WHEN OPERATING AN SOFC SYSTEM WITH ALCOHOL FUELS

BACKGROUND OF THE INVENTION

The present invention relates generally to the field of fuel cells and more specifically to fuel cell systems that are integrated with a hydrometer.

When a fuel cell system is operated on a water-containing fuel, an optimum water-to-fuel ratio is desirable in order for the fuel cell system to operate at peak efficiency. If the fuel does not contain the proper ratio, then water is either added or removed from the fuel. Adding or removing too much water poses a serious risk to the integrity of the fuel cell system. For instance, the risk of coking exists if too little water is added. Moreover, the water-to-fuel ratio of a given fuel source is not homogenous, because the fuel may "stratify" by density while it is stored in a fuel vessel (e.g., alcohol rises to the top and water lowers to the bottom of the vessel). Interrupting the operation of the fuel cell system to perform remedial water addition/removal further decreases the efficiency of the fuel cell system.

SUMMARY OF THE INVENTION

An embodiment of the present invention provides a fuel cell system comprising a fuel cell stack and a hydrometer. The hydrometer is adapted to provide a measurement of a water-to-fuel ratio of a fuel inlet stream in a fuel inlet conduit. A water inlet conduit is adapted to provide a quantity of water into the fuel inlet conduit before the fuel inlet stream is provided to the fuel cell stack.

DETAILED DESCRIPTION OF THE PREFERRED EMBODIMENTS

A fuel cell system is integrated with a hydrometer, such as an alcoholometer, to provide a measurement of a water-to-fuel ratio of a fuel within a fuel inlet conduit before the fuel is provided to the fuel cell stack to achieve a desired steam-to-carbon ratio in the fuel after the fuel is vaporized. A water inlet conduit is adapted to provide a quantity of water, such as liquid water or water vapor, into the fuel inlet conduit in order to attain a desired water-to-fuel ratio of the fuel inlet stream. Thus, a fuel having a desired water-to-fuel ratio (for instance, a methanol fuel for certain SOFC systems has a desired steam-to-carbon ratio of about 2.2 to 1 for optimum system efficiency) is continuously provided to the fuel cell stack, preferably allowing the system to operate at peak efficiency without interrupting the flow of fuel to the fuel cell stack. For instance, the fuel inlet stream has a water-to-fuel ratio that is suitable for steam reformation before being provided to the fuel cell stack.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels, specifically oxygenated hydrocarbon fuels, more specifically hydroxylated hydrocarbon fuels, such as alcohol fuels, for instance ethanol, methanol, and butanol. There are classes of fuel cells, such as the solid oxide regenerative fuel cells, that also allow reversed operation, such that oxidized fuel can be reduced back to unoxidized fuel using electrical energy as an input.

Figure 1:
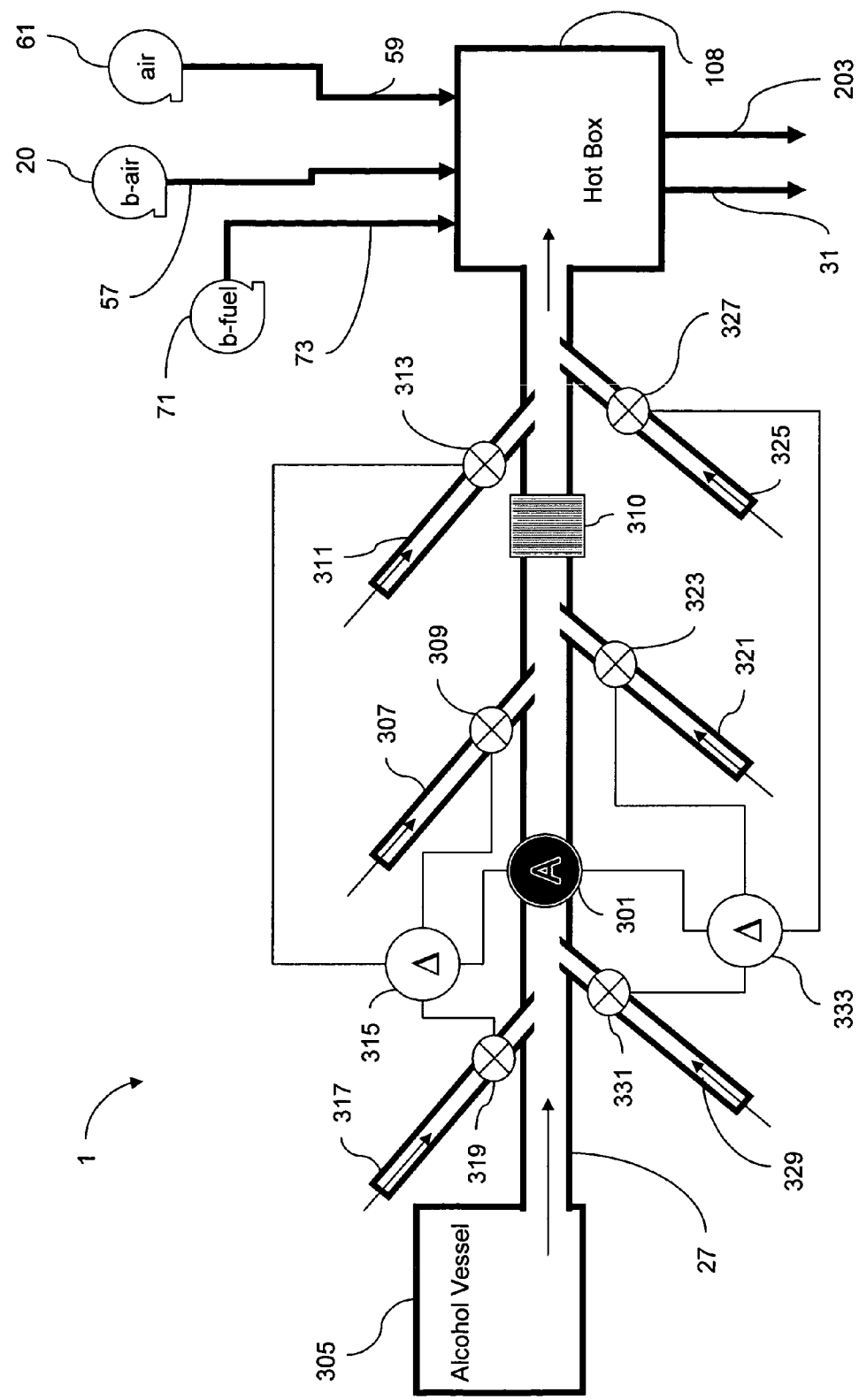
FIG. 1 is a schematic of a fuel cell system according to embodiments of the invention.

FIG. 1 illustrates a fuel cell system 1. The system contains a hot box 108 in which a fuel cell stack and auxiliary components are located. The contents of the hot box 108 are illustrated in detail in FIG. 2 and are described in more detail below. The fuel cell system 1 preferably comprises a high temperature fuel cell system, such as a solid oxide fuel cell (SOFC) system or a molten carbonate fuel cell system. The system 1 may be a regenerative system, such as a solid oxide regenerative fuel cell (SORFC) system which operates in both fuel cell (i.e., discharge) and electrolysis (i.e., charge) modes or it may be a non-regenerative system which only operates in the fuel cell mode. For example, the fuel cell system described in U.S. patent application Ser. No. 11/002,681, filed on Dec. 3, 2004, which is hereby incorporated by reference in its entirety, may be used.

The system 1 also contains a fuel inlet conduit 27 which provides a fuel inlet stream, such as an alcohol fuel inlet stream, from a fuel source, such as an alcohol fuel vessel 305, such as an alcohol storage tank, to the fuel cell stack in the hot box 108. An air inlet conduit 59 provides air from a blower 61 to the stack in the hot box 108. Optionally, the system 1 also contains an optional burner or a combustor in the hot box 108, as will be described in more detail with respect to in FIG. 2. In this case, the system 1 also contains a burner fuel delivery conduit 73 and a burner air delivery conduit 57 which provide fuel and air, respectively, into the burner from a burner fuel pump 71 and a burner air blower 20, respectively.

The system 1 also contains a hydrometer, such as an alcoholometer 301, which provides a measurement of the fuel inlet stream within the fuel inlet conduit 27. The alcoholometer 301 is discussed in greater detail below with respect to in FIG. 3 and measures the fuel content in the fuel inlet stream. Other types of hydrometers besides alcoholometers may be used to measure the fuel content of other types of fuels besides alcohol fuels. For instance, any fuel may be used if its fuel content can be determined by measuring its specific gravity. Optionally, the fuel cell stack and/or other hot box components provides the heat and/or electricity to operate the alcoholometer 301.

The system 1 also contains at least one water inlet conduit that is adapted to provide a quantity of water, which may be in either the liquid or vapor phase, into the fuel inlet conduit 27 in order to increase the water-to-fuel ratio of the fuel inlet stream to a desired water-to-fuel ratio. The water inlet conduit is positioned at a location along the fuel inlet conduit 27 and may be positioned upstream or downstream relative to the location of the alcoholometer 301. In a first embodiment, a downstream water inlet conduit 307 is located downstream of the alcoholometer 301 and is adapted to provide a quantity of water into the fuel inlet conduit 27 through a downstream water inlet valve 309. In a second embodiment, a downstream water vapor inlet conduit 311 is located downstream of both the alcoholometer 301 and a heat exchanger 310, where the fuel inlet stream is vaporized to form a water vapor and an alcohol vapor. The downstream water vapor inlet conduit 311 is adapted to provide a quantity of water vapor into the fuel inlet conduit 27 through a downstream water vapor inlet valve 313. The water vapor provided by the conduit 311 may be formed in an evaporator or may be provided from the hot box 108, such as from the fuel exhaust stream conduit 31. Optionally, the evaporator may comprise a steam generator, such as the steam generator using heat available from an exhaust stream of the fuel cell system described in U.S. patent application Ser. No. 11/236,737, filed on Sep. 28, 2005, which is hereby incorporated by reference in its entirety. In a third embodiment, an upstream water inlet conduit 317 is located upstream of the alcoholometer 301 and is adapted to provide a quantity of water into the fuel inlet conduit 27 through an upstream water inlet valve 319. Optionally, a control device 315 is adapted to adjust the quantity of water provided to the fuel inlet conduit 27 based on the measurement of the water-to-fuel ratio provided by the alcoholometer 301. The control device may comprise any suitable system controller, such as a computer, a control panel or a dedicated control logic chip. The control device 315 is electrically connected to the alcoholometer 301 and to at least one of the valves 309, 313, 319. The control device 315 may comprise a feed-forward control system and/or a feed-back control system in order to maintain the desired water-to-fuel ratio of the fuel that is ultimately provided to the fuel cell stack in the hot box 108. The fuel cell stack may be electrically connected to the device 315 via an electrical conduit in order to provide electrical power to the device 315 or to any other components that require electrical power. In this case, the device 315 may monitor the electrical power output of the fuel cell stack as a function of the measured water-to-fuel ratio and thereby determine the desired water-to-fuel ratio for the particular system 1 operating on a particular fuel source.

The system 1 may also optionally include at least one purified fuel inlet conduit that is adapted to provide a quantity of purified fuel, which may be in either the liquid or vapor phase, into the fuel inlet conduit 27 in order to decrease the water-to-fuel ratio of the fuel inlet stream to a desired water-to-fuel ratio. The purified fuel may be purified in a fuel purification system that is integrated with the fuel cell system described in U.S. patent application Ser. No. 11/522,976, filed on Sep. 19, 2006, which is hereby incorporated by reference in its entirety. The purified fuel inlet conduit is positioned at a location along the fuel inlet conduit 27 and may be positioned upstream or downstream relative to the location of the alcoholometer 301. In a first embodiment, a downstream water inlet conduit 321 is located downstream of the alcoholometer 301 and is adapted to provide a quantity of purified fuel into the fuel inlet conduit 27 through a downstream purified fuel inlet valve 323. In a second embodiment, a downstream purified fuel vapor inlet conduit 325 is located downstream of both the alcoholometer 301 and the heat exchanger 310. The downstream water vapor inlet conduit 325 is adapted to provide a quantity of purified fuel vapor into the fuel inlet conduit 27 through a downstream fuel vapor inlet valve 327. The purified fuel vapor provided by the conduit 325 may be formed in an evaporator or may be provided from the hot box 108, such as from the fuel exhaust stream conduit 31. Optionally, the fuel cell stack and/or other hot box components provide the heat necessary to vaporize the purified fuel, for instance, the heat is provided from the exhaust stream conduits 31, 203. In a third embodiment, an upstream purified fuel inlet conduit 329 is located upstream of the alcoholometer 301 and is adapted to provide a quantity of purified fuel into the fuel inlet conduit 27 through an upstream purified fuel inlet valve 331. Optionally, a control device 333 is adapted to adjust the quantity of purified fuel provided to the fuel inlet conduit 27 based on the measurement of the water-to-fuel ratio provided by the alcoholometer 301. The purified fuel control device 333 may comprise the same or different physical device as the water control device 315. The control device 333 is electrically connected to the alcoholometer 301 and to at least one of the valves 323, 327, 331. The control device 333 may comprise a feed-forward control system and/or a feed-back control system in order to maintain the desired water-to-fuel ratio of the fuel that is ultimately provided to the fuel cell stack in the hot box 108. The fuel cell stack may be electrically connected to the device 333 via an electrical conduit in order to provide electrical power to the device 333 or to any other components that require electrical power.

After being vaporized in the heat exchanger 310, the fuel inlet stream may be provided from the fuel inlet conduit 27 directly to the fuel cell stack in the hot box 108 (if the fuel cells are of the internal reformation type, as will be discussed in greater detail with respect to in FIG. 2) or directly to the reformer in the hot box 108 (if the fuel cells are of the external reformation type, as will be discussed in greater detail with respect to FIG. 2) for steam reformation. The desired water-to-fuel ratio is preferably within a range which allows the fuel inlet stream to be directly reformed using steam reformation, either directly in the fuel cells or in an external reformer. Thus, the quantity of water provided by the valves 309, 313, 319 and/or the quantity of purified fuel provided by the valves 323, 327, 331 is preferably controlled to provide a water-to-fuel ratio within this predetermined ratio range. For instance, a desired steam-to-carbon ratio to achieve optimum system efficiency for a methanol fuel stream for certain SOFC systems is about 2.2 to 1. The desired water-to-fuel ratio for other types of fuel depends on such factors as the particular fuel's chemistry and thermodynamics. The desired water-to-fuel ratio may also depend on the system type and geometry.

Figure 2:
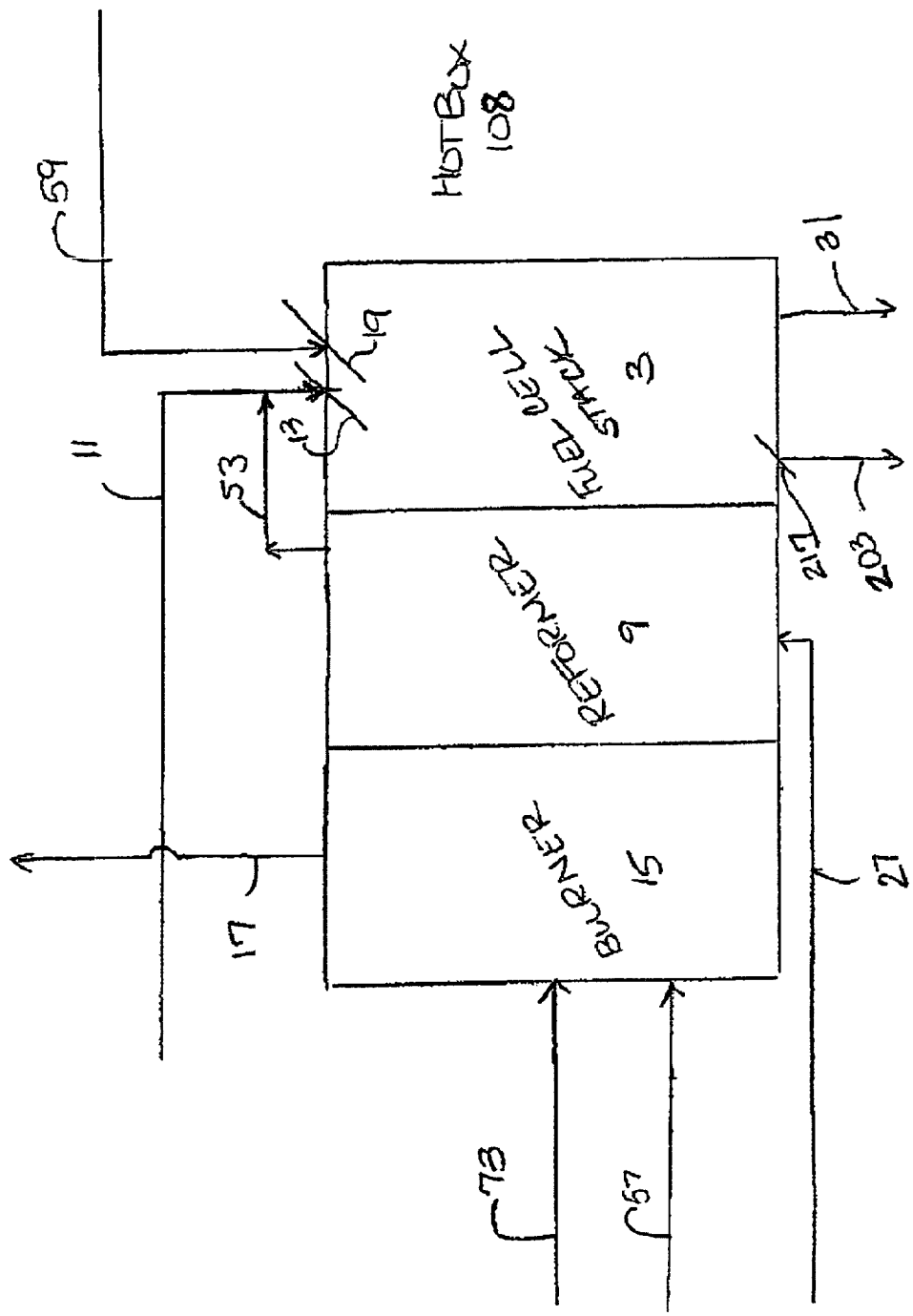
FIG. 2 is a schematic of a hot box portion of the system of FIG. 1.

FIG. 2 illustrates details of a portion of the fuel cell system 1 which is located in the hot box 108 shown in FIG. 1. The fuel cell system contains one or more fuel cell stacks 3, each of which contains a plurality of high temperature fuel cells. Each fuel cell contains an electrolyte, an anode electrode on one side of the electrolyte in an anode chamber, a cathode electrode on the other side of the electrolyte in a cathode chamber, as well as other components, such as separator plates/electrical contacts, fuel cell housing and insulation. In an SOFC operating in the fuel cell mode, the oxidizer, such as air or oxygen gas, enters the cathode chamber, while the fuel, such as hydrogen or hydrocarbon fuel, enters the anode chamber. Any suitable fuel cell designs and component materials may be used.

The fuel cells of the stack 3 may be internal reformation type fuel cells. Fuel cells of this type contain a fuel reformation catalyst in the anode electrode and/or in the anode chamber to allow the hydrocarbon fuel, such as an oxygenated hydrocarbon fuel, to be reformed internally on or adjacent to the fuel cell anode electrodes. Alternatively, the fuel cells may be external reformation type fuel cells. Fuel cells of this type require an external reformer 9 either because these fuel cells lack the fuel reformation catalyst in the anode electrode and/or in the anode chamber, or because the internal reformation catalyst may not be able to reform a desired amount of hydrocarbon fuel. Thus, the fuel reformation may be internal, external or partially internal and partially external (i.e., reformation in the reformer and in the fuel cells). A purified fuel from the purification unit 301 is preferably internally and/or externally steam reformed prior to being utilized in the fuel cells of the fuel cell stack 3 to generate electricity. If the reformer 9 is present in the system 1, then this reformer is preferably located separately from but thermally integrated with the high temperature fuel cell stack 3 to support the endothermic reaction in the reformer 9 and to cool the stack 3. The system also preferably contains a burner or combustor 15. Thus, the system comprises a thermally integrated reformer 9, combustor 15 and stack 3. The reformer 9 may be heated by the stack cathode exhaust, by radiative and convective heat from the stack and/or by the combustor heat during steady state operation.

The term "thermally integrated" in this context means that the heat from the reaction in the fuel cell stack 3 drives the net endothermic fuel reformation in the fuel reformer 9. As illustrated in FIG. 2, the fuel reformer 9 may be thermally integrated with the fuel cell stack 3 by placing the reformer 9 and stack 3 in the same hot box 108 and/or in thermal contact with each other, or by providing a thermal conduit or thermally conductive material which connects the stack 3 to the reformer 9.

The stack 3 generates enough heat to conduct the steam reformation reaction in the reformer 9 during steady-state operation of the system 1. However, under some different operating conditions ranging from low to high stack efficiency and fuel utilization, the exothermic heat generated by the stack 3 and provided to the reformer 9 may be greater than, the same as or less than the heat required to support the reforming reaction in the reformer 9. The heat generated and/or provided by the stack 3 may be less than required to support steam reformation in the reformer 9 due to low fuel utilization, high stack efficiency, heat loss and/or stack failure/turndown. In this case, supplemental heat is supplied to the reformer 9. The system 1 provides the supplemental heat to the reformer 9 to carry out the reformation reaction during steady state operation. The supplemental heat may be provided from the burner or combustor 15 which is thermally integrated with the reformer 9 and/or from a cathode (i.e., air) exhaust conduit which is thermally integrated with the reformer 9. While less preferred, the supplemental heat may also be provided from the anode (i.e., fuel) exhaust conduit which is thermally integrated with the reformer. The supplemental heat may be provided from both the combustor 15 which is operating during steady state operation of the reformer (and not just during start-up) and from the cathode (i.e., air) exhaust of the stack 3. For example, the combustor 15 may be in direct contact with the reformer, and the stack cathode exhaust conduit 203 is configured such that the cathode exhaust contacts the reformer 9 and/or wraps around the reformer 9 to facilitate additional heat transfer. This lowers the combustion heat requirement for the reformation reaction.

The reformer 9 may be sandwiched between the combustor 15 and one or more stacks 3 to assist heat transfer as described in more detail below. For example, the reformer 9 and combustor 15 share at least one wall. The combustor 15, when attached to the reformer 9, closes the heat balance and provides additional heat required by the reformer. When no heat is required by the reformer, the combustor unit acts as a heat exchanger. Thus, the same combustor (i.e., burner) 15 may be used in both start-up and steady-state operation of the system 1. When using combustion catalysts coated on the conduit walls, the fuel may be introduced at several places in the combustion zone to avoid auto ignition and local heating.

In operation, a purified hydrocarbon fuel and steam mixture is fed to the lower end of the reformer 9 through the fuel inlet conduit 27. If desired, the fuel may be provided directly into the stack via a by-pass conduit 11 which by-passes the reformer 9. The reformed product is provided from the reformer 9 into the stack anode (fuel) inlet 13 through conduit 53. The spent fuel is exhausted from the stack through the anode exhaust conduit 31.

The air enters the stack through the cathode (air) inlet 19 and exits through exhaust opening 217 into the cathode (i.e., air) exhaust conduit 203. The system 1 is preferably configured such that the cathode exhaust (i.e., hot air) exits on the same side of the system as the inlet of the reformer 9. For example, as shown in FIG. 2, since the mass flow of hot cathode exhaust is the maximum at the lower end of the device, it supplies the maximum heat where it is needed, at feed point of the reformer 9. In other words, the mass flow of the hot air exiting the stack is maximum adjacent to the lower portion of the reformer 9 where the most heat is needed. However, the cathode exhaust and reformer inlet may be provided in other locations in the system 1, such as to a steam generator. If desired, the hot combustor 15 exhaust may be provided into the steam generator through conduit 17 to heat the water in the generator to generate steam. The combustor exhaust may be provided into the steam generator in addition to or instead of one or more exhaust streams from the fuel cell stack 3.

Figure 3:
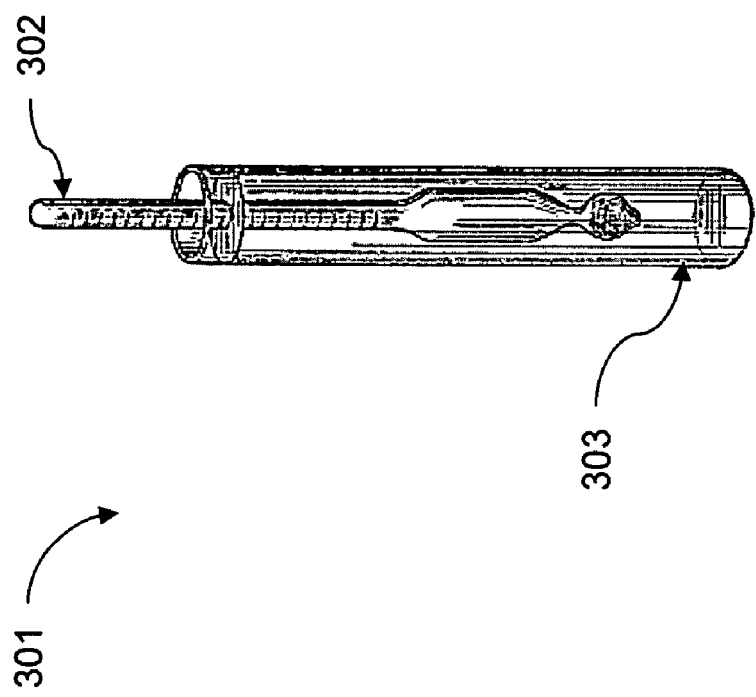
FIG. 3 is a schematic of an alcoholometer of the system of FIG. 1.

FIG. 3 illustrates the alcoholometer 301 shown in the system 1 of FIG. 1. The alcoholometer 301 is a type of hydrometer that is specifically calibrated to measure the content of alcohol in a mixture. For instance, the alcoholometer 301 measures the alcohol content of a water/alcohol mixture based on the density of the mixture. The alcoholometer 301 includes a cylindrical stem 302 that is weighted at the bottom and which contains calibrated markings corresponding to the alcohol content for a particular alcohol. The alcoholometer 301 is placed into a container 303 filled with the alcohol mixture. The alcoholometer 301 sinks deeper into a mixture having more alcohol than it would sink in a mixture having less alcohol. For instance, the density of water is 1.0 g/cm$^3$, whereas the densities of methanol and ethanol are 0.7918 g/cm$^3$ and 0.789 g/cm$^3$, respectively. Preferably, the alcoholometer 301 is a digital electronic hydrometer capable of real-time monitoring, measuring, logging and controlling of density/specific gravity of alcohol fuels. The alcoholometer may be integrated as part of the control device(s) 315, 333. Preferably, the alcoholometer 301 is capable of measuring the water-to-fuel ratio and transmitting the measurement signal to the control device(s) 315, 333 in a sufficiently short time so as to allow at least one of the conduits 307, 311, 317, 321, 325, 329 to add a sufficient quantity of water and/or purified fuel to achieve the desired water-to-fuel ratio of the fuel inlet stream before the fuel inlet stream is provided to the fuel cell stack. Thus, the system efficiency is always at an optimum, even as the water-to-fuel concentration varies between different fuel sources or within a given fuel source. For instance, a given fuel source of alcohol fuel that has been stored for a period of time in an alcohol vessel undergoes stratification, i.e., a gradient of water-to-fuel ratios forms along the height of the alcohol vessel. The system 1 is capable of providing the fuel cell stack with a fuel inlet stream having the desired water-to-fuel ratio during the continuous use of the given fuel source. However, the present invention is not limited to alcoholometers and alcohol fuels. Other types of hydrometers besides alcoholometers may be used to measure the water-to-fuel content of fuels other than alcohol fuels. Indeed, based on the measurement of an appropriate hydrometer and subsequent remedial water addition/removal, the water-to-fuel ratio of any water-containing fuel may be continuously provided to the fuel cell stack.

In operation, the alcoholometer 301 may provide the measurement either continuously or intermittently. The alcoholometer 301 may determine when a situation arises where the water concentration of the fuel is too great to allow for efficient system operation. In this case, an alarm condition could be triggered, or a "clean-up" process could be triggered to remove some amount of the water from the alcohol fuel, for instance by distilling the water-rich fuel using the heat available from at least one of the exhaust streams 31, 203. For instance, the distillation unit described in U.S. patent application Ser. No. 11/522976, filed on Sep. 19, 2006, may be used.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
providing a fuel inlet stream from a fuel source into a fuel inlet conduit;
measuring, using a senor, a first water-to-fuel ratio of the fuel inlet stream in the fuel inlet conduit;
providing a quantity of water into the fuel inlet conduit downstream from the sensor if the first water-to-fuel ratios is less than a predetermined water-to-fuel ratio; and
providing the fuel inlet stream into a fuel cell stack, wherein the fuel inlet stream comprises a second water-to-fuel ratio that is substantially equal to the predetermined water-to-fuel ratio;
wherein the step of providing the quantity of water downstream from the sensor comprises at least one of:
providing liquid water into the fuel inlet conduit downstream from the sensor and upstream from a heat exchanger in which the water and the fuel are vaporized; or
providing water vapor into the fuel inlet conduit downstream from the sensor and downstream from the heat exchanger in which the water and the fuel are vaporized.

2. The method of claim 1, wherein the step of providing the quantity of water comprises opening a water valve in a water inlet conduit downstream from the sensor if the first water-to-fuel ratio is less than the desired water-to-fuel ratio.

3. The method of claim 1, wherein:
the fuel source comprises an alcohol fuel source; and
the sensor comprises an alcoholometer in the fuel inlet stream.

4. The method of claim 1, wherein the step of providing the quantity of water downstream from the sensor comprises providing liquid water into the fuel inlet conduit downstream from the sensor and upstream from the heat exchanger in which the water and the fuel are vaporized if the first water-to-fuel ratio is less than the desired water-to-fuel ratio.

5. The method of claim 1, wherein the step of providing the quantity of water downstream from the sensor comprises providing water vapor into the fuel inlet conduit downstream from the sensor and downstream from the heat exchanger in which the water and the fuel are vaporized if the first water-to-fuel ratio is less than the desired water-to-fuel ratio.

6. The method of claim 1, wherein the fuel source comprises impure alcohol fuel comprising water and having a first water-to-fuel ratio.

7. The method of claim 6, further comprising,
providing a quantity of purified fuel into the fuel inlet conduit if the first water-to-fuel ratio is greater than the desired water-to-fuel ratio.

8. The method of claim 7, wherein the step of providing the quantity of purified comprises providing liquid fuel into the fuel inlet conduit downstream from the sensor and upstream from the heat exchanger in which the water and the fuel are vaporized if the first water-to-fuel ratio is greater than the desired water-to-fuel ratio.

9. The method of claim 7, wherein the step of providing the quantity of purified fuel comprises providing fuel vapor into the fuel inlet conduit downstream from the sensor and downstream from the heat exchanger in which the water and the fuel are vaporized if the first water-to-fuel ratio is greater than the desired water-to-fuel ratio.

10. A method of operating a fuel cell system, comprising:
providing a fuel inlet stream from a fuel source into a fuel inlet conduit, wherein the fuel inlet stream provided from the fuel source comprises water and has a first water-to-fuel ratio;
measuring, using a sensor, the first water-to-fuel ratio of the fuel inlet stream in the fuel inlet conduit;
providing a quantity of water into the fuel inlet conduit downstream from the sensor if the first water-to-fuel ratio is less than a predetermined water-to-fuel ratio such that the fuel inlet stream comprises a second water-to-fuel ratio that is substantially equal to the predetermined water-to-fuel ratio and that is different from the first water-to-fuel ratio and
providing the fuel inlet stream having the second water-to-fuel ratio into a fuel cell stack,
wherein the step of providing the quantity of water downstream from the sensor comprises at least one of:
opening a water valve in a water inlet conduit to provide liquid water into the fuel inlet conduit downstream from the sensor and upstream from a heat exchanger in which the water and the fuel are vaporized; or
opening a water vapor valve in a water vapor inlet conduit to provide water vapor into the fuel inlet conduit downstream from the sensor and downstream from the heat exchanger in which the water and the fuel are vaporized.

11. The method of claim 10, wherein the step of providing the quantity of water downstream from the sensor comprises opening the water valve in the water inlet conduit to provide liquid water into the fuel inlet conduit downstream from the sensor and upstream from the heat exchanger if the first water-to-fuel ratio is less than the desired water-to-fuel ratio.

12. The method of claim 10, wherein the step of providing the quantity of water downstream from the sensor comprises opening the water vapor valve in the water vapor inlet conduit to provide water vapor into the fuel inlet conduit downstream from the sensor and downstream from the heat exchanger in which the water and the fuel are vaporized if the first water-to-fuel ratio is less than the desired water-to-fuel ratio.

13. The method of claim 10, further comprising providing a quantity of purified fuel into the fuel inlet conduit if the first water-to-fuel ratio is greater than the predetermined water-to-fuel ratio such that the fuel inlet stream comprises a second water-to-fuel ratio that is substantially equal to a predetermined water-to-fuel ratio and that is different from the first water-to-fuel ratio.

14. The method of claim 13, wherein the step of providing the quantity of purified fuel into the fuel inlet conduit occurs downstream from the sensor.

15. The method of claim 13, wherein the step of providing the quantity of purified fuel downstream from the sensor comprises opening a fuel valve in a purified fuel inlet conduit to provide purified liquid fuel into the fuel inlet conduit downstream from the sensor and upstream from the heat exchanger in which the water and the fuel are vaporized if the first water-to-fuel ratio is greater than the predetermined water-to-fuel ratio.

16. The method of claim 13, wherein the step of providing the quantity of purified fuel downstream from the sensor comprises opening a fuel vapor valve in purified fuel vapor inlet conduit to provide purified fuel vapor into the fuel inlet conduit downstream from the sensor and downstream from the heat exchanger in which the water and the fuel are vaporized if the first water-to-fuel ratio is greater than the predetermined water-to-fuel ratio.

17. The method of claim 10, wherein the fuel comprises an alcohol fuel, and the sensor comprises an alcoholometer in the fuel inlet conduit.

18. The method of claim 5, wherein the water vapor is supplied by an anode exhaust stream of the fuel cell stack.

19. The method of claim 9, wherein the fuel vapor is supplied by an anode exhaust stream of the fuel cell stack.

20. The method of claim 12, wherein the water vapor is supplied by an anode exhaust stream of the fuel cell stack.

21. The method of claim 16, wherein the fuel vapor is supplied by an anode exhaust stream of the fuel cell stack.

22. A method of operating a fuel cell system, comprising:
   providing a fuel inlet stream from a fuel source into a fuel inlet conduit;
   measuring, using a sensor, a first water-to-fuel ratio of the fuel inlet stream in the fuel inlet Conduit;
   providing a quantity of purified fuel into the fuel inlet conduit downstream from the sensor if the first water-to-fuel ratio is greater than a predetermined water-to-fuel ratio; and
   providing the fuel inlet stream into a fuel cell stack, wherein the fuel inlet stream comprises a second water-to-fuel ratio that is substantially equal to the predetermined water-to-fuel ratio;
   wherein the step of providing the quantity of purified fuel downstream from the sensor comprises at least one of:
      providing liquid fuel into the fuel inlet conduit downstream from the sensor and upstream from a heat exchanger in which the water and the fuel are vaporized; or
      providing fuel vapor into the fuel inlet conduit downstream from the sensor and downstream from the heat exchanger in which the water and the fuel are vaporized.

23. The method of claim 22, wherein the step of providing the quantity of purified fuel downstream from the sensor comprises providing liquid fuel into the fuel inlet conduit downstream from the sensor and upstream from the heat exchanger in which the water and the fuel are vaporized if the first water-to-fuel ratio is greater than the predetermined water-to-fuel ratio.

24. The method of claim 22, wherein the step of providing the quantity of purified fuel downstream from the sensor comprises providing fuel vapor into the fuel inlet conduit downstream from the sensor and downstream from the heat exchanger in which the water and the fuel are vaporized if the first water-to-fuel. ratio is greater than the predetermined water-to-fuel ratio.

25. The method of claim 22, wherein:
   the fuel source comprises an alcohol fuel source; and
   the sensor comprises am alcoholometer in the fuel inlet stream.

26. The method of claim 25, wherein the fuel source comprises impure alcohol fuel comprising water and having the first water-to-fuel ratio.

* * * * *